United States Patent
Adusumilli et al.

(10) Patent No.: US 12,413,955 B2
(45) Date of Patent: Sep. 9, 2025

(54) ASSOCIATION OF MULTIPLE SUBSCRIBER IDENTITY MODULES

(71) Applicant: QUALCOMM Incorporated, San Diego, CA (US)

(72) Inventors: Neel Tej Adusumilli, San Diego, CA (US); Mayank Arora, Hyderabad (IN); Ozcan Ozturk, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 420 days.

(21) Appl. No.: 18/043,980

(22) PCT Filed: Jun. 30, 2021

(86) PCT No.: PCT/US2021/070796
§ 371 (c)(1),
(2) Date: Mar. 3, 2023

(87) PCT Pub. No.: WO2022/006592
PCT Pub. Date: Jan. 6, 2022

(65) Prior Publication Data
US 2024/0007842 A1    Jan. 4, 2024

(30) Foreign Application Priority Data
Jul. 3, 2020   (IN) .............................. 202041028371

(51) Int. Cl.
*H04W 24/02* (2009.01)
*H04W 8/18* (2009.01)
*H04W 88/02* (2009.01)

(52) U.S. Cl.
CPC ................... *H04W 8/18* (2013.01)

(58) Field of Classification Search
CPC ........ H04W 8/18; H04W 8/183; H04W 76/11; H04W 48/18; H04W 88/06
USPC ........................................................ 455/418
See application file for complete search history.

(56) References Cited

U.S. PATENT DOCUMENTS

| | | | |
|---|---|---|---|
| 2017/0150545 A1* | 5/2017 | Ramkumar | H04W 8/082 |
| 2018/0160422 A1* | 6/2018 | Pathak | H04W 76/10 |
| 2019/0116483 A1 | 4/2019 | Ryu et al. | |
| 2021/0282103 A1* | 9/2021 | Zhu | H04W 76/15 |
| 2022/0053586 A1* | 2/2022 | Purkayastha | H04W 76/11 |
| 2022/0394458 A1* | 12/2022 | Liang | H04W 76/15 |

FOREIGN PATENT DOCUMENTS

| | | |
|---|---|---|
| WO | WO-2018143763 A1 | 8/2018 |
| WO | WO-2020137238 A1 | 7/2020 |

OTHER PUBLICATIONS

IP.com search (Year: 2025).*
International Search Report and Written Opinion—PCT/US2021/070796—ISA/EPO—Oct. 12, 2021.

* cited by examiner

*Primary Examiner* — Moustapha Diaby
(74) *Attorney, Agent, or Firm* — Harrity & Harrity, LLP (57) ABSTRACT

Various aspects of the present disclosure generally relate to wireless communication. In some aspects, a user equipment (UE) may perform a radio resource control (RRC) setup procedure for a first subscriber identity module (SIM) of the UE and transmit a serving temporary mobile subscriber identity of the first SIM in association with an RRC setup procedure for a second SIM. Numerous other aspects are provided.

20 Claims, 8 Drawing Sheets

ASSOCIATION OF MULTIPLE SUBSCRIBER IDENTITY MODULES

CROSS-REFERENCE TO RELATED APPLICATION APPLICATIONS

This Patent Application is a 371 national stage of PCT Application No. PCT/US2021/070796 filed on Jun. 30, 2021, entitled "ASSOCIATION OF MULTIPLE SUBSCRIBER IDENTITY MODULES," which claims priority to India Patent Application No. 202041028371, filed on Jul. 3, 2020, entitled "ASSOCIATION OF MULTIPLE SUBSCRIBER IDENTITY MODULES," which are both hereby expressly incorporated by reference herein.

FIELD OF THE DISCLOSURE

Aspects of the present disclosure generally relate to wireless communication and to techniques and apparatuses for associating multiple subscriber identity modules with the same user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include performing a radio resource control (RRC) setup procedure for a first subscriber identity module (SIM) of the UE, and transmitting a serving temporary mobile subscriber identity (S-TMSI) of the first SIM in association with an RRC setup procedure for a second SIM.

In some aspects, a method of wireless communication, performed by a base station, may include transmitting, to a first SIM of a UE, an S-TMSI of the first SIM in association with an RRC setup procedure for the first SIM. The method may include associating a second SIM with the UE based at least in part on receiving, from the second SIM, the S-TMSI of the first SIM, and performing a procedure that is based at least in part on the first SIM and the second SIM being associated with the UE.

In some aspects, a UE for wireless communication may include a memory and one or more processors coupled to the memory. The one or more processors may be configured to perform an RRC setup procedure for a first SIM of the UE, and transmit an S-TMSI of the first SIM in association with an RRC setup procedure for a second SIM.

In some aspects, a base station for wireless communication may include a memory and one or more processors coupled to the memory. The one or more processors may be configured to transmit, to a first SIM of a UE, an S-TMSI of the first SIM in association with an RRC setup procedure for the first SIM. The one or more processors may be configured to associate a second SIM with the UE based at least in part on receiving, from the second SIM, the S-TMSI of the first SIM, and perform a procedure that is based at least in part on the first SIM and the second SIM being associated with the UE.

In some aspects, a non-transitory computer-readable medium may store one or more instructions for wireless communication. The one or more instructions, when executed by one or more processors of a UE, may cause the one or more processors to perform an RRC setup procedure for a first SIM of the UE, and transmit an S-TMSI of the first SIM in association with an RRC setup procedure for a second SIM.

In some aspects, a non-transitory computer-readable medium may store one or more instructions for wireless communication. The one or more instructions, when executed by one or more processors of a base station, may cause the one or more processors to transmit, to a first SIM of a UE, an S-TMSI of the first SIM in association with an RRC setup procedure for the first SIM, associate a second SIM with the UE based at least in part on receiving, from the second SIM, the S-TMSI of the first SIM, and perform a procedure that is based at least in part on the first SIM and the second SIM being associated with the UE.

In some aspects, an apparatus for wireless communication may include means for performing an RRC setup procedure for a first SIM of the apparatus and means for transmitting an S-TMSI of the first SIM in association with an RRC setup procedure for a second SIM.

In some aspects, an apparatus for wireless communication may include means for transmitting, to a first SIM of a UE, an S-TMSI of the first SIM in association with an RRC setup procedure for the first SIM, means for associating a second SIM with the UE based at least in part on receiving, from the second SIM, the S-TMSI of the first SIM, and means for performing a procedure that is based at least in part on the first SIM and the second SIM being associated with the UE.

Aspects generally include a method, apparatus, system, computer program product, non-transitory computer-readable medium, UE, base station, wireless communication device, node, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
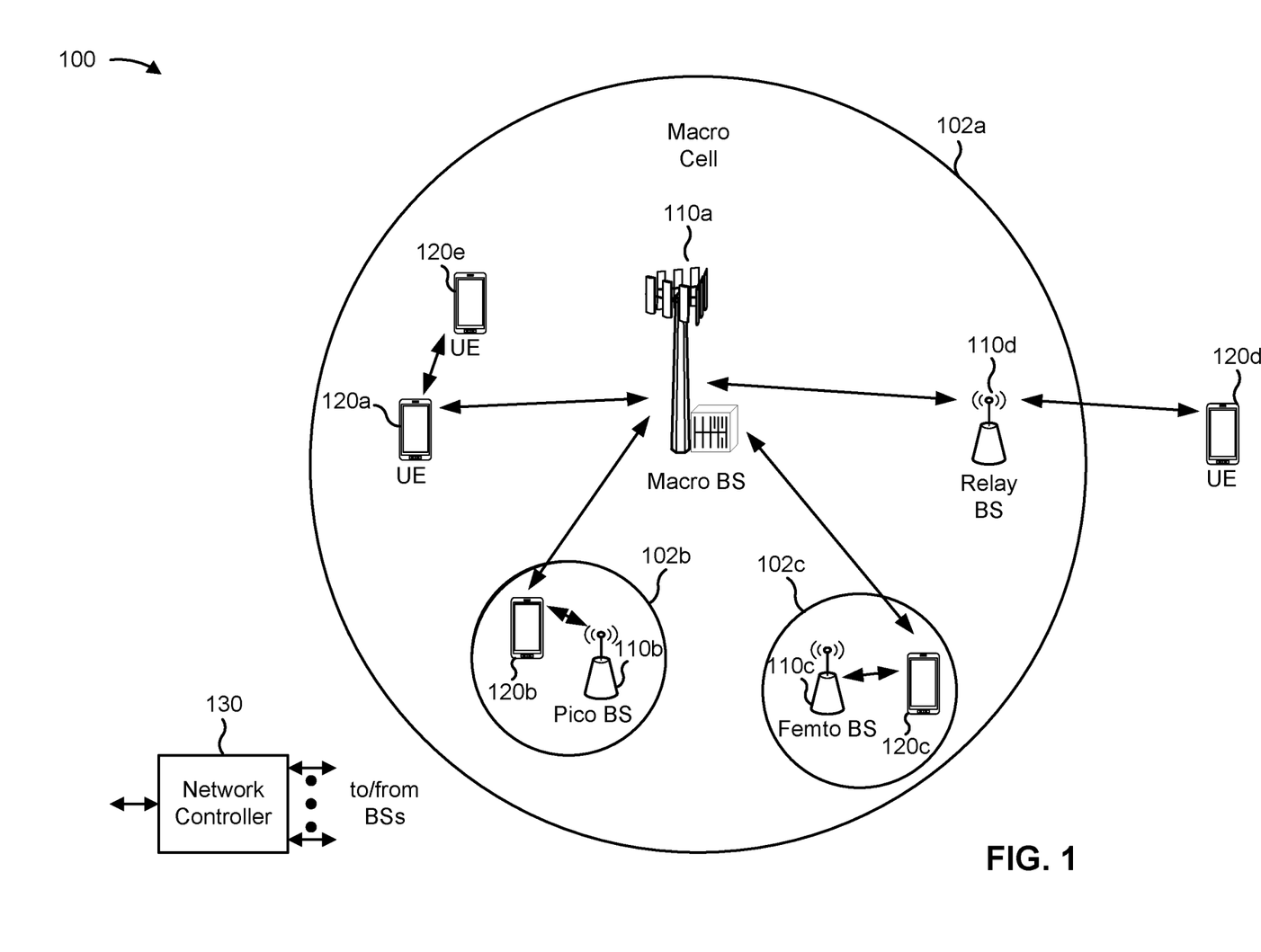
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "CNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrow band internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz. FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above. FIG. 1 is provided as an example. Other examples may differ from what is described with regard to FIG. 1.

Figure 2:
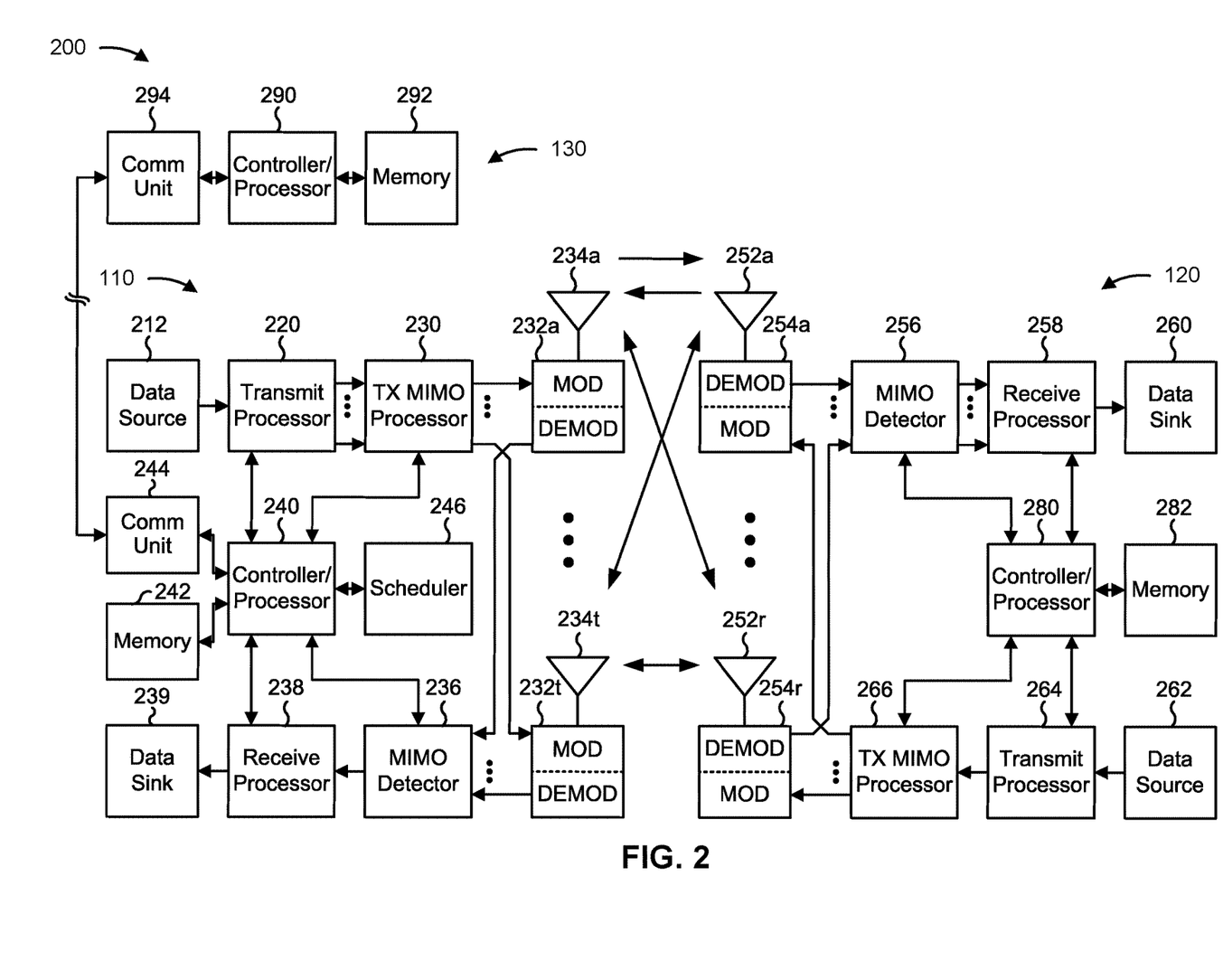
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T' antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with associating multiple subscriber identity modules (SIMs) with the same UE, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for performing a radio resource control (RRC) setup procedure for a first SIM of UE 120 and/or means for transmitting a serving temporary mobile subscriber identity (S-TMSI) of the first SIM in association with an RRC setup procedure for a second SIM. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for transmitting, to a first SIM of a UE, an S-TMSI of the first SIM in association with an RRC setup procedure for the first SIM, means for associating a second SIM with the UE based at least in part on receiving, from the second SIM, the S-TMSI of the first SIM, and/or means for performing a procedure that is based at least in part on the first SIM and the second SIM being associated with the UE. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some aspects, a UE may have a dual 5G (NR) modem (e.g., SM8350) for two SIMs, referred to herein as a first SIM and a second SIM. Either SIM may support dual SIM dual active or dual SIM dual standby, and either SIM may be associated with a default data subscriber (DDS) subscriber registration (e.g., non-standalone network) or a non-DDS subscriber registration (e.g., LTE).

The first SIM (or the UE controlling the first SIM) may communicate with a base station in a wireless communication network. The first SIM may receive configuration information, paging messages, and resource scheduling from the base station, and the first SIM may provide UE capability information and paging feedback to the base station. The second SIM (or the UE controlling the second SIM) may also receive configuration information, paging messages, and resource scheduling from the base station, as well as provide UE capability information and paging feedback to the base station. However, the base station receiving and providing this information may not know that the first SIM and the second SIM are in the same UE. This means that the UE and the base station may be sending and receiving redundant information associated with the UE (e.g., same configuration information, same handover information, same UE capability information, same feedback). Such redundancy may cause the UE and the base station to waste time, power, signaling resources, and processing resources.

There may also be collisions due to the base station scheduling the first SIM and the second SIM at a time when both the first SIM and the second SIM of the same UE need to use the radio resources of the UE. These collisions may be a result of the base station being unaware that the first SIM and the second SIM are in the same UE and have to share the radio resources of the UE. Collisions may lead to degraded communications and a waste of time, power, processing resources, and signaling resources.

Paging occasions for each SIM of the UE are based on a UE identifier (UE_ID) that is assigned to each SIM by the base station. The base station may provide different UE_IDs to each SIM and thus each SIM may have a different paging occasion for monitoring for a page from the base station. Another consequence of the base station being unaware that the first SIM and the second SIM share radio resources of the same UE is that one SIM may miss a page while the other SIM is actively transmitting or receiving data. In fact, when the UE determines that the UE is to respond to a page (or provide an update) for the second SIM, the UE may have to prematurely release the RRC connection for the first SIM. This may lead to an error case and distorted statistics for scheduling algorithms. The base station may also continue paging the UE for the first SIM. These circumstances may cause the UE and the base station to waste processing resources and signaling (e.g., paging) resources.

According to various aspects described herein, the UE may help the base station to create an association between multiple SIMs and the UE. For example, the base station may provide an S-TMSI to the first SIM in association with an RRC setup of the first SIM. The second SIM (or the UE for the first SIM) may provide this S-TMSI of the first SIM to the base station (e.g. in an RRC setup complete message) in association with an RRC setup of the second SIM. In this way, the base station may associate the first SIM and the second SIM with the same UE.

Consequently, the base station may perform one of multiple procedures that are based at least in part on the base station associating the first SIM and the second SIM with the same UE. For example, the base station may obtain UE capability information from the first SIM. Because the first SIM and the second SIM share radio resources of the same UE, the base station may refrain from obtaining the same UE capability information from the second SIM. In some aspects, the base station may configure the UE so that the UE monitors the same paging occasion for both SIMs. These procedures, and other procedures, may help the UE and the base station to transmit and receive information for one SIM that may be the same as information for another SIM of the same UE. Eliminating redundant signaling of information causes the UE and the base station to save time, power, processing resources, and signaling resources.

Figure 3:
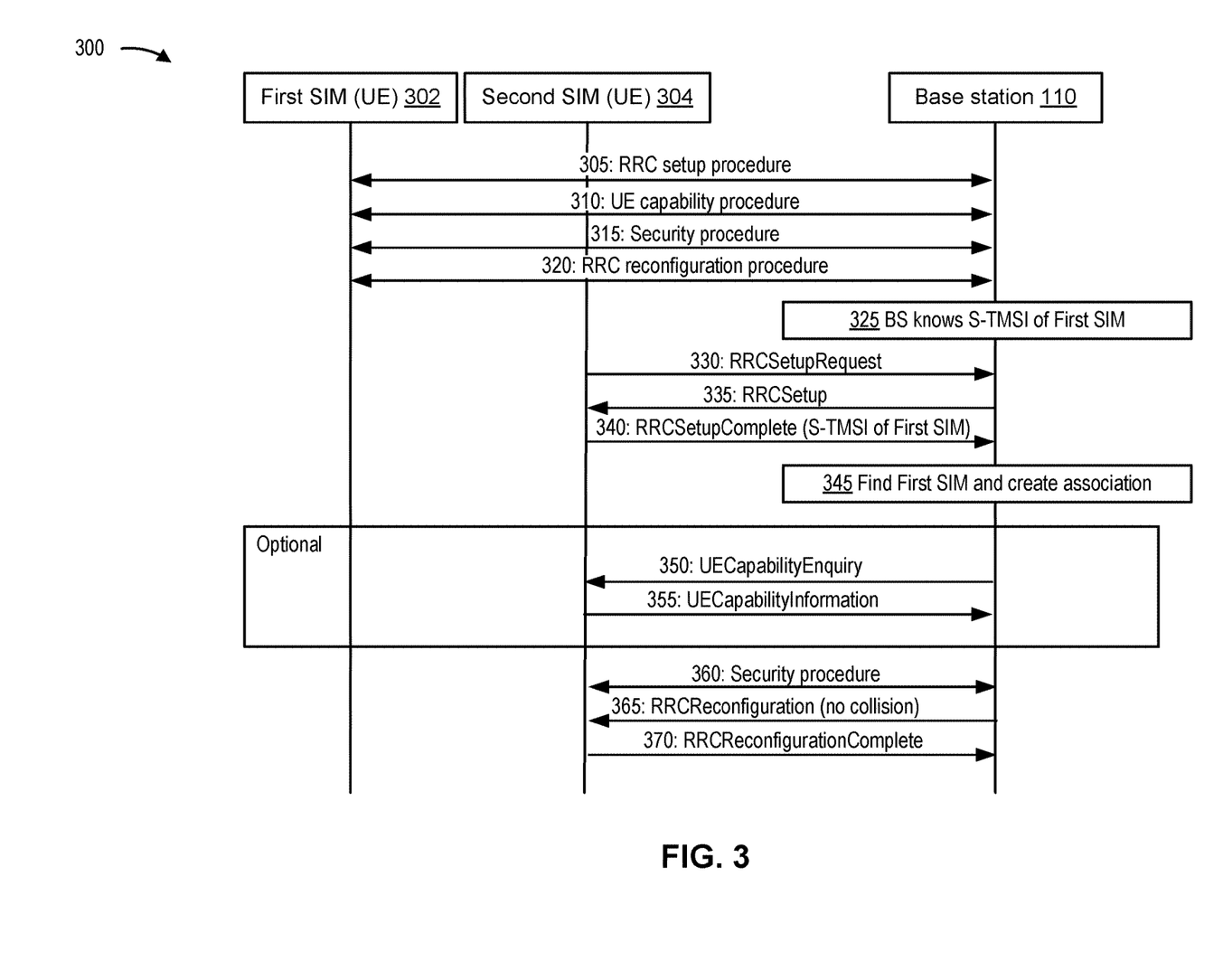
FIG. 3 is a diagram illustrating an example of associating multiple subscriber identity modules (SIMs) with the same UE, in accordance with the present disclosure.

FIG. 3 is a diagram illustrating an example 300 of associating multiple SIMs with the same UE, in accordance with the present disclosure. In example 300, a UE (e.g., a UE 120) may set up an RRC connection with a base station (e.g., a base station 110). More specifically, the UE may set up an RRC connection with the base station for a first SIM 302 of the UE and for a second SIM 304 of the same UE. The first SIM 302 and the second SIM 304 may be multiple universal SIMs (multi-USIMs) with the same mobile network operator. The first SIM 302 and the second SIM 304 may share radio resources (common radio and baseband components) of the UE.

As shown by reference 305, the UE may, for the first SIM 302, perform an RRC setup procedure. The RRC setup procedure may include the first SIM 302 transmitting an RRC setup request to the base station 110, receiving an RRC setup message, and transmitting an RRC setup complete message.

The base station 110 may obtain UE capability information for the UE, which may indicate which RATs, frequency bands, UE categories, carrier aggregation combinations, and/or modulation and coding schemes are supported by radio resources of the UE. For example, as shown by reference number 310, the base station 110 may perform a UE capability procedure with the first SIM 302.

The base station 110 may perform a security procedure with the first SIM 302, as shown by reference number 315. The security procedure may be an existing process that includes the UE transmitting, for the first SIM 302, a user authentication request with a random challenge and an authentication token. The base station 110 may transmit a user authentication response, indicating whether the authentication of the first SIM 302 is successful. During the security procedure, the base station 110 may transmit an S-TMSI assigned to the first SIM 302.

The base station 110 may perform an RRC reconfiguration procedure, as shown by reference number 320. The RRC reconfiguration procedure may be used to add, modify, or release an RRC connection, including setting up, modifying, or releasing radio bearers, measurements, or cells. At this point, the base station 110 knows the S-TMSI of the first SIM, as shown by reference number 325.

As shown by reference number 330, the UE may cause the second SIM 304 to transmit an RRC setup request to the base station 110, as part of an RRC setup procedure for the second SIM 304. The second SIM 304 may receive an RRC setup message, as shown by reference number 335. The second SIM 304 may transmit an RRC setup complete message to the base station 110, as shown by reference number 340. However, in some aspects, the second SIM 304 may transmit the S-TMSI of the first SIM 302 in association with the RRC setup of the second SIM 304. Given security concerns for the first SIM 302 and the second SIM 304, the S-TMSI is an appropriate identifier for the second SIM to transmit to the base station 110.

The base station 110, having received the S-TMSI of the first SIM 302 from the second SIM 304, may associate the second SIM 304 with the same UE as the first SIM 302, as shown by reference number 345. As a result of an association of the first SIM 302 and the second SIM 304 with the same UE, the base station 110 may perform a procedure that is based at least in part on the association.

In some aspects, the procedure may include refraining from performing a UE capability procedure with the second SIM 304. The UE capability procedure may now be optional. That is, it may not be necessary for the base station 110 to transmit a UE capability enquiry to the second SIM 304, as shown by reference number 350, and receive UE capability information for the UE, as shown by reference number 355. The base station 110 may have received that same UE capability information from the first SIM 302. Instead of performing the UE capability procedure with the second SIM 304, the base station 110 may proceed with a security procedure for the second SIM 304, as shown by reference number 360.

In some aspects, the base station 110 may proceed with an RRC setup procedure, but, having determined that the first SIM 302 and the second SIM 304 are in the same UE, the base station 110 may schedule resources for the second SIM 304 that do not conflict with the first SIM 302, as shown by reference number 365. The first SIM 302 and the second SIM 304 share the radio resources of the UE, and avoiding collisions conserves time, power, processing resources, and signaling resources that would otherwise be spent resolving resource collisions. The UE may transmit an RRC reconfiguration complete message to conclude the RRC setup for the second SIM 304, as shown by reference number 370.

As indicated above, FIG. 3 is provided as an example. Other examples may differ from what is described with regard to FIG. 3.

Figure 4:
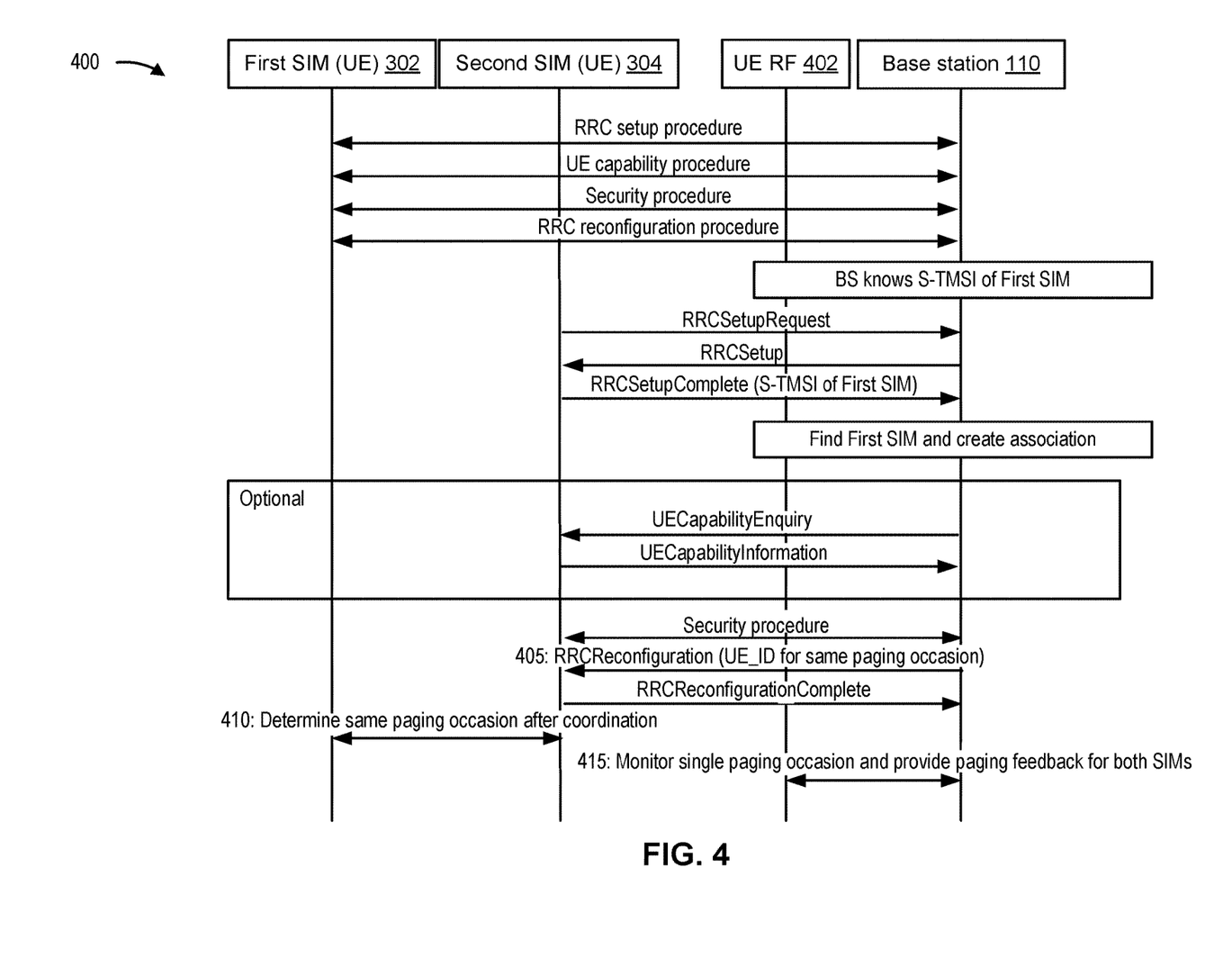
FIG. 4 is a diagram illustrating an example of associating multiple SIMs with the same UE, in accordance with the present disclosure.

FIG. 4 is a diagram illustrating an example 400 of associating multiple SIMs with the same UE (e.g., UE 120), in accordance with the present disclosure. FIG. 4 shows, similar to FIG. 3, a second SIM of a UE that transmits an S-TMSI of a first SIM 302 of the same UE to a base station (e.g., base station 110), such that the base station 110 creates an association of the first SIM 302 and the second SIM 304 with the same UE.

FIG. 4 shows a paging optimization procedure that the UE may perform based at least in part on the association. Many of the steps shown in FIG. 4 are those shown in FIG. 3. After the UE creates the association, the base station 110 may transmit an RRC reconfiguration message to the second SIM 304, as shown by reference number 405, with an S-TMSI that would enable the first SIM 302 and the second SIM 304 to derive the same UE_ID. The first SIM 302 and the second SIM 304, having derived the same UE_ID, as shown by reference number 410, may monitor the same paging occasion for both SIMs via UE radio frequency (RF) interface 402, as shown by reference number 415. As a result, the UE may save power, processing resources, and signaling resources by monitoring only a single paging occasion during a discontinuous reception (DRX) cycle. In some aspects, the base station 110 may allocate the same DRX configuration to the first SIM 302 and the second SIM 304 such that the paging occasion is common to both the first SIM 302 and the second SIM 304.

In some aspects, the UE may determine a paging occasion (or paging frequency) based at least in part on a particular formula. For example, the UE may determine the same paging occasion for the first SIM 302 and the second SIM 304 by performing a modulo function on the S-TMSI of the first SIM 302, performing the modulo function on an S-TMSI of the second SIM 304, and determining that a result of performing the modulo function on the S-TMSI of the first SIM 302 matches a result of performing the modulo function on the S-TMSI of the second SIM 304. In a more detailed example, the UE may determine a system frame number (SFN) for a paging frequency (PF) by (SFN+ PF_offset) mod T=(T div N)*(UE_ID mod N). T may be a value provided for a SIM (e.g., S-TMSI), and N may be a length of a system frame (e.g., 1024). The UE may determine an index (i s) of a paging occasion as floor (UE_ID/N) mod N. For example, for 5G NR, a UE_ID may be derived from performing a modulo function on an S-TMSI for a SIM. The UE may perform a modulo function (e.g., mod 1024) on the S-TMSI of the first SIM 302 with a result of 1.

The UE may perform the same modulo function on the S-TMSI of the second SIM 304, also with a result of 1. As the results match, the UE_ID is the same for both SIMs, and both SIMs may share the same paging occasion.

The UE_ID and the DRX may be parameters that are common to both SIMs, such that both SIMs have the same paging occasion (and the same paging frequency). When the paging occasion and/or the paging frequency are the same for both the first SIM 302 and the second SIM 304, the UE may need only to prepare for monitoring one paging occasion, which is the same for both the first SIM 302 and the second SIM 304. In some aspects, the base station 110 may create pairs of S-TMSIs such that a pair of S-TMSIs can be assigned to a pair of SIMs of the same UE. The pair of S-TMSIs may be determined such that a result of a modulo function on each S-TMSI renders that same UE_ID for each SIM and thus the same paging occasion for the pair of SIMs. Note that while S-TMSIs are described for two SIMs of the same UE, values other than an S-TMSI may be used for creating the association, and more than two SIMs may be associated with the same UE.

As indicated above, FIG. 4 is provided as an example. Other examples may differ from what is described with regard to FIG. 4.

Figure 5:
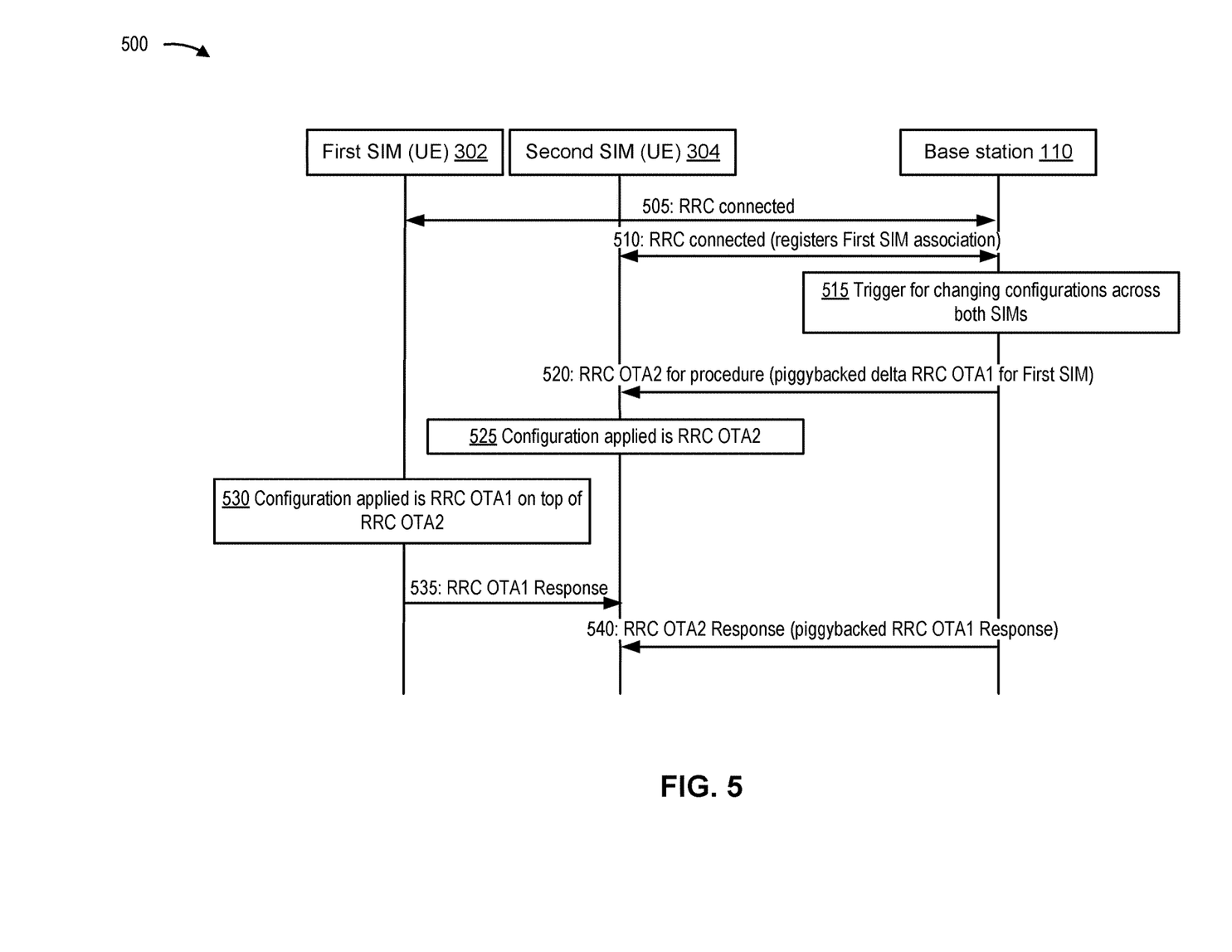
FIG. 5 is a diagram illustrating an example of associating multiple SIMs with the same UE, in accordance with the present disclosure.

FIG. 5 is a diagram illustrating an example 500 of associating multiple SIMs with the same UE (e.g., UE 120), in accordance with the present disclosure. FIG. 5 shows, similar to FIGS. 3 and 4, a second SIM 304 of a UE that transmits an S-TMSI of a first SIM 302 of the same UE to a base station (e.g., base station 110), such that the base station 110 creates an association between the first SIM 302 and the second SIM 304 with the same UE.

As shown by reference number 505, the first SIM 302 may perform an RRC setup procedure to become RRC connected to the base station 110. As shown by reference number 510, the second SIM 304 may also become RRC connected to the base station 110, indicating an association with the first SIM 302.

There may be an event or command that triggers a change of configurations at the first SIM 302 and the second SIM 304, as shown by reference number 515. In some aspects, the base station 110 may transmit an RRC configuration for both the first SIM 302 and the second SIM 304 in a single RRC reconfiguration message. This is possible because the base station 110 is aware of the association of the first SIM 302 and the second SIM 304 with the same UE. As shown by reference number 520, the base station 110 may have configuration information for the second SIM 304 (shown as over-the-top message OTA2 in FIG. 5) and configuration information that may be dedicated for the first SIM 302 (shown as OTA1 in FIG. 5). The configuration information for the first SIM 302 may be a difference (e.g., delta) between the configuration information dedicated for the first SIM 302 and configuration information common to the first SIM 302 and the second SIM 304. For example, there may be information elements (or components of particular information elements) that are for the first SIM 302 but not for both the first SIM 302 and the second SIM 304. The configuration information dedicated for the first SIM 302 may be included with, or piggybacked on, the configuration information for the second SIM 304.

As shown by reference number 525, the configuration information for the second SIM 304 may be applied to the second SIM 304, and the configuration information for the first SIM 302 may be applied to the first SIM 302 on top of the configuration information for the second SIM 304, as shown by reference number 530. The first SIM 302 may share an RRC response for the first SIM 302 with the second SIM 304, as shown by reference number 535, and the second SIM 304 may provide an RRC response that includes both the RRC response for the first SIM 302 and an RRC response for the second SIM 304, as shown by reference number 540. As a result, the UE and the base station 110 save signaling resources by sending RRC reconfiguration information for both the first SIM 302 and the second SIM 304 in a single RRC message, and sending an RRC response for both the first SIM 302 and the second SIM 304 in a single RRC response message.

In some aspects, rather than transmitting configuration information for both the first SIM 302 and the second SIM 304, whether piggybacked or not, the base station 110 may transmit only configuration information dedicated to one of the SIMs. This is possible because the SIMS may retain common configuration information. For example, the first SIM 302 or the second SIM 304 may apply the common configuration information, and the other SIM may apply the common configuration information plus dedicated configuration information received from the base station 110. The dedicated configuration information may form a smaller message (e.g., smaller quantity of information elements or information element components) and this may save signaling resources. In some aspects, the dedicated configuration information may be able to override some resource scheduling that would have led to a resource collision.

As indicated above, FIG. 5 is provided as an example. Other examples may differ from what is described with regard to FIG. 5.

Figure 6:
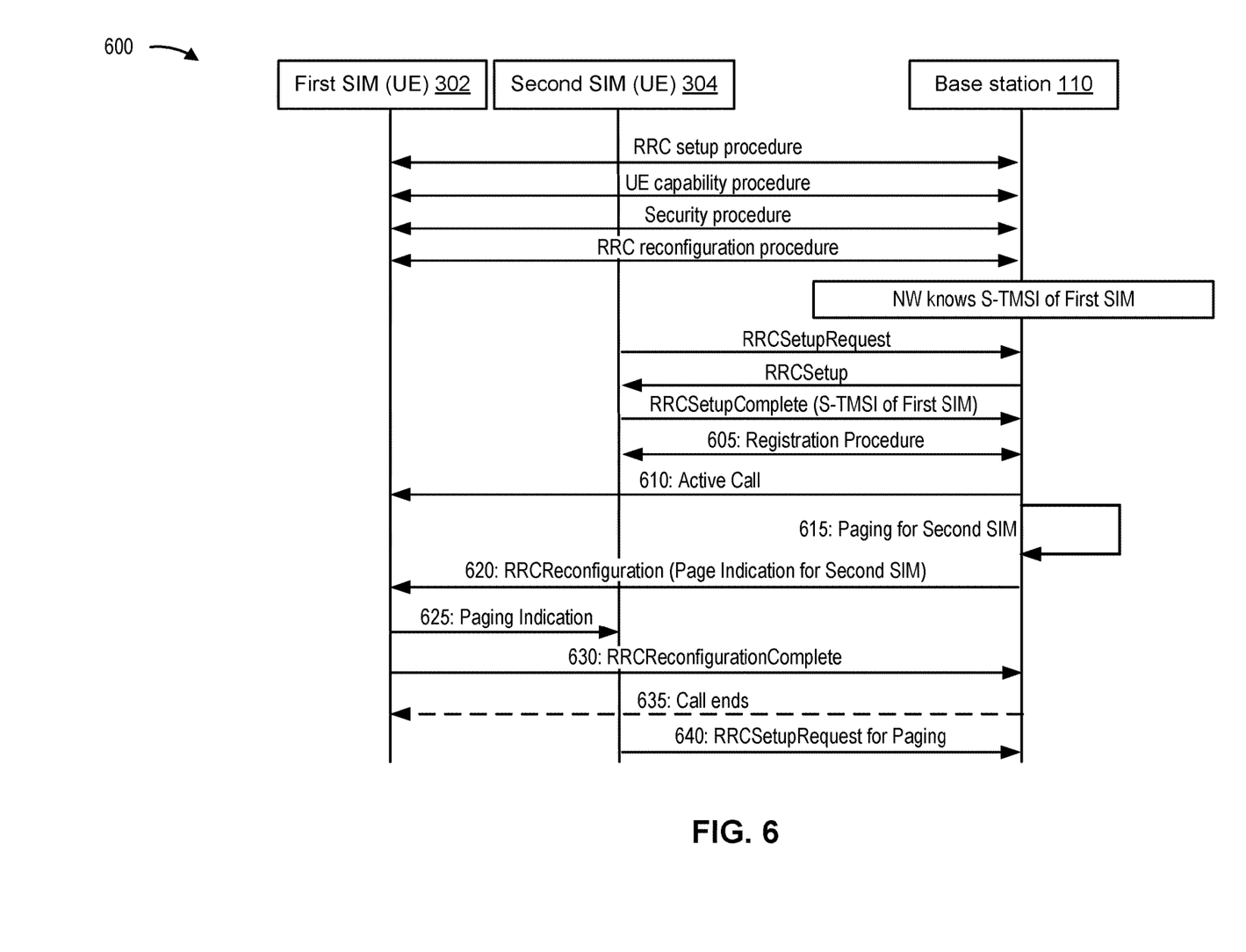
FIG. 6 is a diagram illustrating an example of associating multiple SIMs with the same UE, in accordance with the present disclosure.

FIG. 6 is a diagram illustrating an example 600 of associating multiple SIMs with the same UE (e.g., UE 120), in accordance with the present disclosure. FIG. 6 shows, similar to FIG. 3, a second SIM 304 of a UE that transmits an S-TMSI of a first SIM 302 of the same UE to a base station 110, such that the base station 110 creates an association of the first SIM 302 and the second SIM 304 with the same UE.

As shown by FIG. 6, and by reference number 605, the second SIM 304 may perform a registration procedure with the base station 110, and then the first SIM 302 may be on an active call, as shown by reference number 610. In some aspects, the base station 110 may need to transmit a page for the second SIM 304, as shown by reference number 615. The base station 110, being aware that the first SIM 302 and the second SIM 304 are sharing radio resources of the same UE, may determine that the second SIM 304 may not be able to receive the page because the first SIM 302 is on an active call. Accordingly, the first SIM 302 (or the UE controlling the first SIM 302) may receive an RRC reconfiguration message with a page indication (e.g., paging feedback) for the second SIM 304 during the active call of the first SIM 302, as shown by reference number 620. The first SIM 302 may provide a paging indication to the second SIM 304 as well, as shown by reference number 625. The first SIM 302 may transmit an RRC reconfiguration complete message to the base station 110, as shown by reference number 630. As soon as the base station 110 ends the call with the first SIM 302, as shown by reference number 635, the second SIM 304 may provide an RRC setup request for paging, as shown by reference number 640. In other words, the second SIM 304 does not need to wait for another paging occasion to transmit paging feedback. Because the first SIM 302 and the second SIM 304 share radio resources, the active SIM may provide paging feedback for the other SIM such that active SIM does not need to drop the call for the second SIM 304 to provide the paging feedback. As a result, the UE and the base station 110 save time and signaling resources.

In some aspects, an RRC setup complete information element may include a new value for indicating an S-TMSI value of another SIM associated with the same UE. In some aspects, an RRC reconfiguration information element (e.g., v1560) may include an associated configuration (e.g., information elements that are common to both SIMs and/or dedicated to one SIM), and/or a paging indication for avoiding a separate paging occasion for each SIM. In some aspects, an RRC reconfiguration complete information element may include a paging response, so as to avoid switching the radio resources of the UE to another SIM to transmit a paging response. These additional information element components help the UE and the base station 110 to create an association of SIMs with the same UE and save resources by performing procedures that may be optimized based at least in part on the association.

As indicated above, FIG. 6 is provided as an example. Other examples may differ from what is described with regard to FIG. 6.

Figure 7:
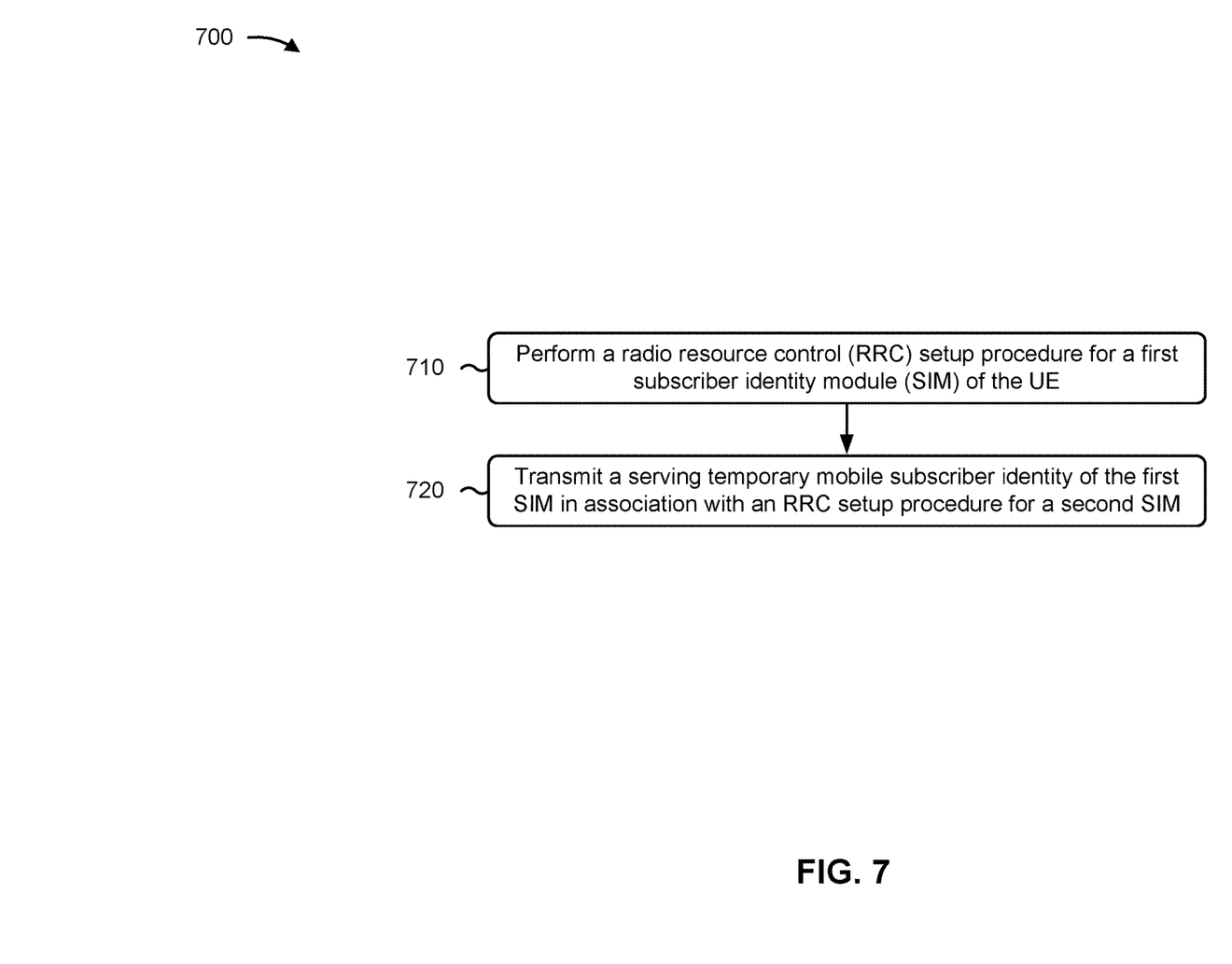
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., a UE 120 depicted in FIGS. 1 and 2, the UE depicted in FIGS. 3-6) performs operations associated with associating multiple SIMs with the same UE.

As shown in FIG. 7, in some aspects, process 700 may include performing an RRC setup procedure for a first SIM of the UE (block 710). For example, the UE (e.g., using receive processor 258, transmit processor 264, controller/processor 280, memory 282) may perform an RRC setup procedure for a first SIM of the UE, as described above.

As further shown in FIG. 7, in some aspects, process 700 may include transmitting an S-TMSI of the first SIM in association with an RRC setup procedure for a second SIM (block 720). For example, the UE (e.g., using receive processor 258, transmit processor 264, controller/processor 280, memory 282) may transmit an S-TMSI of the first SIM in association with an RRC setup procedure for a second SIM, as described above.

Process 700 may include additional aspects, such as any single aspect or any combination of aspects described below and/or in connection with one or more other processes described elsewhere herein.

In a first aspect, transmitting the S-TMSI of the first SIM includes transmitting the S-TMSI in an RRC setup complete message for the second SIM.

In a second aspect, alone or in combination with the first aspect, process 700 includes receiving, by the second SIM, an RRC reconfiguration message indicating a set of resources for the second SIM that do not conflict with a set of resources for the first SIM.

In a third aspect, alone or in combination with one or more of the first and second aspects, process 700 includes monitoring a same paging occasion for the first SIM and the second SIM.

In a fourth aspect, alone or in combination with one or more of the first through third aspects, process 700 includes determining the same paging occasion for the first SIM and the second SIM by performing a modulo function on the S-TMSI of the first SIM, performing the modulo function on an S-TMSI of the second SIM, and determining that a result of performing the modulo function on the S-TMSI of the first SIM matches a result of performing the modulo function on the S-TMSI of the second SIM.

In a fifth aspect, alone or in combination with one or more of the first through fourth aspects, process 700 includes transmitting, for the second SIM, a paging response after the first SIM ends use of radio resources of the UE and before monitoring for a next paging occasion for the UE.

In a sixth aspect, alone or in combination with one or more of the first through fifth aspects, process 700 includes receiving, at the second SIM, configuration information for the first SIM and difference information that indicates a difference between the configuration information for the first SIM and configuration information for the second SIM, applying, to the first SIM, the configuration information for the first SIM, and applying, to the second SIM, the configuration information for the first SIM and the difference information.

In a seventh aspect, alone or in combination with one or more of the first through sixth aspects, process 700 includes receiving, at the second SIM, difference information that indicates a difference between configuration information for the first SIM and common configuration information for the first SIM and the second SIM, and applying, to the second SIM, the common configuration information and the difference information.

In an eighth aspect, alone or in combination with one or more of the first through seventh aspects, the difference information includes information elements dedicated to the second SIM.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
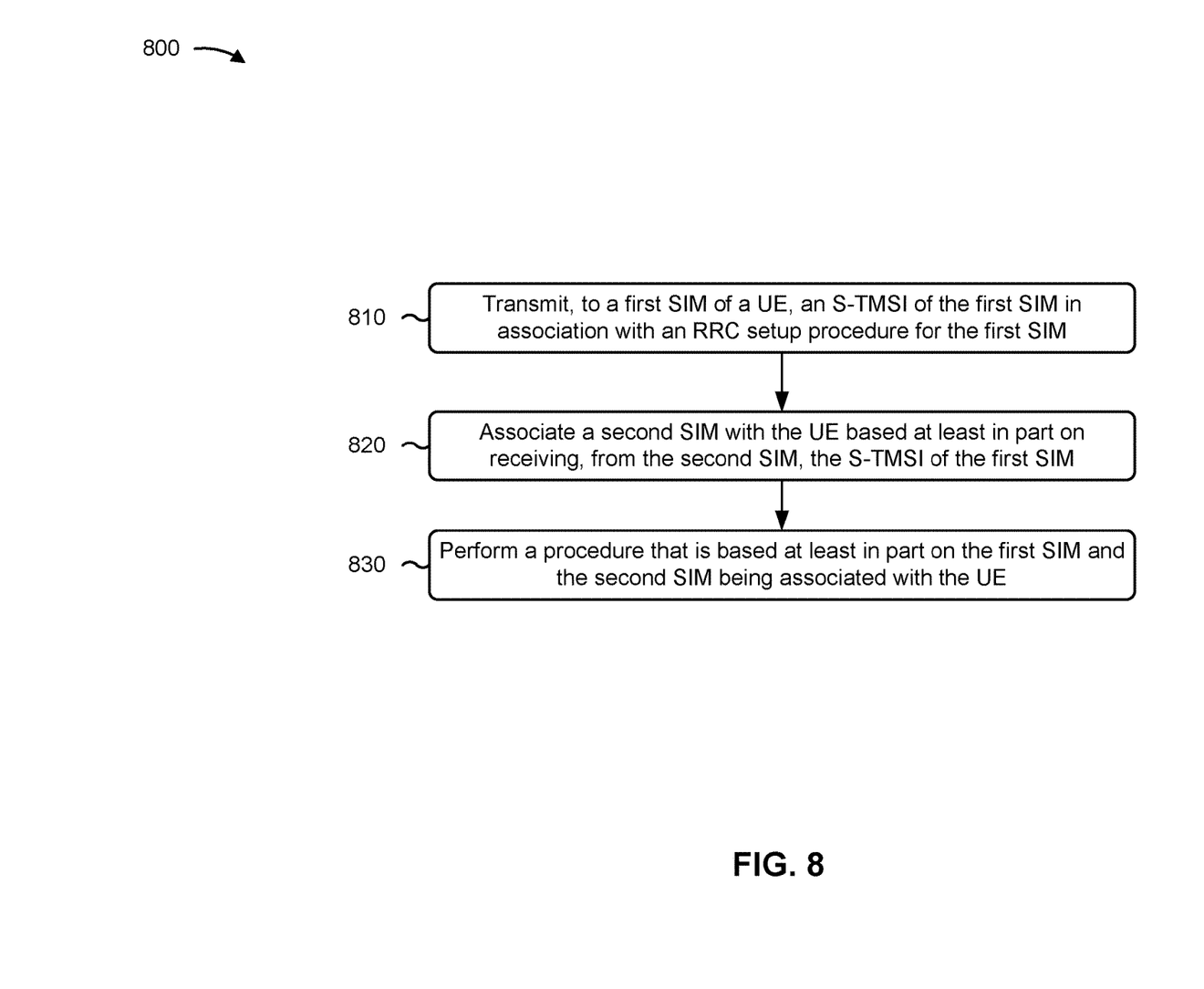
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., a base station 110 depicted in FIGS. 1 and 2, the base station depicted in FIGS. 3-6) performs operations associated with associating multiple SIMs.

As shown in FIG. 8, in some aspects, process 800 may include transmitting, to a first SIM of a UE, an S-TMSI of the first SIM in association with an RRC setup procedure for the first SIM (block 810). For example, the base station (e.g., using transmit processor 220, receive processor 238, controller/processor 240, memory 242) may transmit, to a first SIM of a UE, an S-TMSI of the first SIM in association with an RRC setup procedure for the first SIM, as described above.

As further shown in FIG. 8, in some aspects, process 800 may include associating a second SIM with the UE based at least in part on receiving, from the second SIM, the S-TMSI of the first SIM (block 820). For example, the base station (e.g., using transmit processor 220, receive processor 238, controller/processor 240, memory 242) may associate a second SIM with the UE based at least in part on receiving, from the second SIM, the S-TMSI of the first SIM, as described above.

As further shown in FIG. 8, in some aspects, process 800 may include performing a procedure that is based at least in part on the first SIM and the second SIM being associated with the UE (block 830). For example, the base station (e.g., using transmit processor 220, receive processor 238, controller/processor 240, memory 242) may perform a procedure that is based at least in part on the first SIM and the second SIM being associated with the UE, as described above.

Process 800 may include additional aspects, such as any single aspect or any combination of aspects described below and/or in connection with one or more other processes described elsewhere herein.

In a first aspect, performing the procedure includes transmitting, to the second SIM of the UE, an indication of resources that do not conflict with resources indicated to the first SIM.

In a second aspect, alone or in combination with the first aspect, performing the procedure includes transmitting, to the second SIM of the UE, an S-TMSI that is determined based at least in part on the S-TMSI of the first SIM of the UE, such that the UE may use a same paging occasion for the first SIM and the second SIM.

In a third aspect, alone or in combination with one or more of the first and second aspects, process 800 includes transmitting, to the second SIM, an RRC reconfiguration message indicating a set of resources for the second SIM that do not conflict with a set of resources for the first SIM.

In a fourth aspect, alone or in combination with one or more of the first through third aspects, performing the procedure includes refraining from obtaining UE capability information from the second SIM, and using UE capability information from the first SIM for the second SIM.

In a fifth aspect, alone or in combination with one or more of the first through fourth aspects, performing the procedure includes transmitting, to the second SIM, configuration information for both the first SIM and the second SIM.

In a sixth aspect, alone or in combination with one or more of the first through fifth aspects, performing the procedure includes transmitting, to the second SIM, configuration information for the first SIM and difference information that indicates a difference between the configuration information for the first SIM and configuration information for the second SIM.

In a seventh aspect, alone or in combination with one or more of the first through sixth aspects, performing the procedure includes transmitting, to the second SIM, difference information that indicates a difference between configuration information for the first SIM and common configuration information for the first SIM and the second SIM.

In an eighth aspect, alone or in combination with one or more of the first through seventh aspects, the difference information includes information elements dedicated to the second SIM.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: performing a radio resource control (RRC) setup procedure for a first subscriber identity module (SIM) of the UE: and transmitting a serving temporary mobile subscriber identity (S-TMSI) of the first SIM in association with an RRC setup procedure for a second SIM.

Aspect 2: The method of Aspect 1, wherein transmitting the S-TMSI of the first SIM includes transmitting the S-TMSI in an RRC setup complete message for the second SIM.

Aspect 3: The method of Aspect 1 or 2, further comprising receiving, by the second SIM, an RRC reconfiguration message indicating a set of resources for the second SIM that do not conflict with a set of resources for the first SIM.

Aspect 4: The method of any of Aspects 1-3, further comprising monitoring a same paging occasion for the first SIM and the second SIM.

Aspect 5: The method of Aspect 4, further comprising determining the same paging occasion for the first SIM and the second SIM by: performing a modulo function on the S-TMSI of the first SIM: performing the modulo function on an S-TMSI of the second SIM: and determining that a result of performing the modulo function on the S-TMSI of the first SIM matches a result of performing the modulo function on the S-TMSI of the second SIM.

Aspect 6: The method of Aspect 4 or 5, further comprising transmitting, for the second SIM, a paging response after the first SIM ends use of radio resources of the UE and before monitoring for a next paging occasion for the UE.

Aspect 7: The method of any of Aspects 1-6, further comprising: receiving, at the second SIM, configuration information for the first SIM and difference information that indicates a difference between the configuration information for the first SIM and configuration information for the second SIM: applying, to the first SIM, the configuration information for the first SIM: and applying, to the second SIM, the configuration information for the first SIM and the difference information.

Aspect 8: The method of any of Aspects 1-7, further comprising: receiving, at the second SIM, difference information that indicates a difference between configuration information for the first SIM and common configuration information for the first SIM and the second SIM: and applying, to the second SIM, the common configuration information and the difference information.

Aspect 9: The method of Aspect 8, wherein the difference information includes information elements dedicated to the second SIM.

Aspect 10: A method of wireless communication performed by a base station, comprising: transmitting, to a first subscriber identity module (SIM) of a user equipment (UE), a serving temporary mobile subscriber identity (S-TMSI) of the first SIM in association with a radio resource control (RRC) setup procedure for the first SIM: associating a second SIM with the UE based at least in part on receiving, from the second SIM, the S-TMSI of the first SIM; and performing a procedure that is based at least in part on the first SIM and the second SIM being associated with the UE.

Aspect 11: The method of Aspect 10, wherein performing the procedure includes transmitting, to the second SIM of the UE, an indication of resources that do not conflict with resources indicated to the first SIM.

Aspect 12: The method of Aspect 10 or 11, wherein performing the procedure includes transmitting, to the second SIM of the UE, an S-TMSI that is determined based at least in part on the S-TMSI of the first SIM of the UE, such that the UE may use a same paging occasion for the first SIM and the second SIM.

Aspect 13: The method of any of Aspects 10-12, further comprising transmitting, to the second SIM, an RRC reconfiguration message indicating a set of resources for the second SIM that do not conflict with a set of resources for the first SIM.

Aspect 14: The method of any of Aspects 10-13, wherein performing the procedure includes refraining from obtaining UE capability information from the second SIM, and using UE capability information from the first SIM for the second SIM.

Aspect 15: The method of any of Aspects 10-14, wherein performing the procedure includes transmitting, to the second SIM, configuration information for both the first SIM and the second SIM.

Aspect 16: The method of any of Aspects 10-14, wherein performing the procedure includes transmitting, to the second SIM, configuration information for the first SIM and difference information that indicates a difference between the configuration information for the first SIM and configuration information for the second SIM.

Aspect 17: The method of any of Aspects 10-14, wherein performing the procedure includes transmitting, to the second SIM, difference information that indicates a difference between configuration information for the first SIM and common configuration information for the first SIM and the second SIM.

Aspect 18: The method of Aspect 17, wherein the difference information includes information elements dedicated to the second SIM.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        perform a radio resource control (RRC) setup procedure for a first subscriber identity module (SIM) of the UE; and
        transmit a serving temporary mobile subscriber identity (S-TMSI) of the first SIM in association with an RRC setup procedure for a second SIM.

2. The UE of claim 1, wherein the one or more processors, to transmit the S-TMSI of the first SIM, are configured to transmit the S-TMSI in an RRC setup complete message for the second SIM.

3. The UE of claim 1, wherein the one or more processors are configured to receive, by the second SIM, an RRC reconfiguration message indicating a set of resources for the second SIM that do not conflict with a set of resources for the first SIM.

4. The UE of claim 1, wherein the one or more processors are configured to monitor a same paging occasion for the first SIM and the second SIM.

5. The UE of claim 4, wherein the one or more processors are configured to determine the same paging occasion for the first SIM and the second SIM by:
performing a modulo function on the S-TMSI of the first SIM;
performing the modulo function on an S-TMSI of the second SIM; and
determining that a result of performing the modulo function on the S-TMSI of the first SIM matches a result of performing the modulo function on the S-TMSI of the second SIM.

6. The UE of claim 4, wherein the one or more processors are configured to transmit, for the second SIM, a paging response after the first SIM ends use of radio resources of the UE and before monitoring for a next paging occasion for the UE.

7. The UE of claim 1, wherein the one or more processors are configured to:
receive, at the second SIM, configuration information for the first SIM and difference information that indicates a difference between the configuration information for the first SIM and configuration information for the second SIM;
apply, to the first SIM, the configuration information for the first SIM; and
apply, to the second SIM, the configuration information for the first SIM and the difference information.

8. The UE of claim 1, wherein the one or more processors are configured to:
receive, at the second SIM, difference information that indicates a difference between configuration information for the first SIM and common configuration information for the first SIM and the second SIM; and
apply, to the second SIM, the common configuration information and the difference information.

9. The UE of claim 8, wherein the difference information includes information elements dedicated to the second SIM.

10. A base station for wireless communication, comprising:
a memory; and
one or more processors, coupled to the memory, configured to:
transmit, to a first subscriber identity module (SIM) of a user equipment (UE), a serving temporary mobile subscriber identity (S-TMSI) of the first SIM in association with a radio resource control (RRC) setup procedure for the first SIM;
associate a second SIM with the UE based at least in part on receiving, from the second SIM, the S-TMSI of the first SIM; and
perform a procedure that is based at least in part on the first SIM and the second SIM being associated with the UE.

11. The base station of claim 10, wherein the one or more processors, to perform the procedure, are configured to transmit, to the second SIM of the UE, an indication of resources that do not conflict with resources indicated to the first SIM.

12. The base station of claim 10, wherein the one or more processors, to perform the procedure, are configured to transmit, to the second SIM of the UE, an S-TMSI that is determined based at least in part on the S-TMSI of the first SIM of the UE, such that the UE may use a same paging occasion for the first SIM and the second SIM.

13. The base station of claim 10, wherein the one or more processors are configured to transmit, to the second SIM, an RRC reconfiguration message indicating a set of resources for the second SIM that do not conflict with a set of resources for the first SIM.

14. The base station of claim 10, wherein the one or more processors, to perform the procedure, are configured to refrain from obtaining UE capability information from the second SIM, and using UE capability information from the first SIM for the second SIM.

15. The base station of claim 10, wherein the one or more processors, to perform the procedure, are configured to transmit, to the second SIM, configuration information for both the first SIM and the second SIM.

16. The base station of claim 10, wherein the one or more processors, to perform the procedure, are configured to transmit, to the second SIM, configuration information for the first SIM and difference information that indicates a difference between the configuration information for the first SIM and configuration information for the second SIM.

17. The base station of claim 10, wherein the one or more processors, to perform the procedure, are configured to transmit, to the second SIM, difference information that indicates a difference between configuration information for the first SIM and common configuration information for the first SIM and the second SIM.

18. The base station of claim 17, wherein the difference information includes information elements dedicated to the second SIM.

19. A method of wireless communication performed by a user equipment (UE), comprising:
performing a radio resource control (RRC) setup procedure for a first subscriber identity module (SIM) of the UE; and
transmitting a serving temporary mobile subscriber identity (S-TMSI) of the first SIM in association with an RRC setup procedure for a second SIM.

20. The method of claim 19, further comprising:
monitoring a same paging occasion for the first SIM and the second SIM; and
transmitting, for the second SIM, a paging response after the first SIM ends use of radio resources of the UE and before monitoring for a next paging occasion for the UE.

* * * * *